US012618287B2

(12) United States Patent
Roberts et al.

(10) Patent No.: US 12,618,287 B2
(45) Date of Patent: May 5, 2026

(54) SECURITY SCREEN MOUNTING SYSTEM AND METHOD THEREFOR

(71) Applicants: Don Roberts, Tupelo, MS (US); James Wilford Roberts, Saltillo, MS (US)

(72) Inventors: Don Roberts, Tupelo, MS (US); James Wilford Roberts, Saltillo, MS (US)

( * ) Notice: Subject to any disclaimer, the term of this patent is extended or adjusted under 35 U.S.C. 154(b) by 0 days.

(21) Appl. No.: 18/368,648

(22) Filed: Sep. 15, 2023

(65) Prior Publication Data

US 2024/0003182 A1    Jan. 4, 2024

Related U.S. Application Data

(62) Division of application No. 17/115,533, filed on Dec. 8, 2020, now Pat. No. 11,808,083.

(51) Int. Cl.
| | |
|---|---|
| *E06B 9/04* | (2006.01) |
| *B60J 1/20* | (2006.01) |
| *E06B 9/52* | (2006.01) |
| *E06B 9/00* | (2006.01) |

(52) U.S. Cl.
CPC .............. *E06B 9/04* (2013.01); *B60J 1/2094* (2013.01); *E06B 9/52* (2013.01); *E06B 2009/005* (2013.01); *E06B 2009/527* (2013.01)

(58) Field of Classification Search
CPC ........ E06B 9/04; E06B 9/52; E06B 2009/527; E06B 2009/005; B60J 1/2094
USPC .......... 52/202, 203, 204.51, 204.62, 204.66, 52/656.7
See application file for complete search history.

(56) References Cited

U.S. PATENT DOCUMENTS

| | | | | | |
|---|---|---|---|---|---|
| 3,545,521 | A | * | 12/1970 | Noecker ................... | E06B 9/52 |
| | | | | | 160/180 |
| 4,544,012 | A | * | 10/1985 | Woodward ................ | E06B 9/02 |
| | | | | | 160/90 |
| 6,079,475 | A | * | 6/2000 | Morgan ................... | E06B 9/04 |
| | | | | | 160/371 |
| 6,505,669 | B2 | * | 1/2003 | Lilie ........................ | E06B 9/04 |
| | | | | | 160/90 |
| 7,712,268 | B1 | * | 5/2010 | Guthrie ................... | E06B 5/003 |
| | | | | | 52/202 |
| 2018/0094477 | A1 | * | 4/2018 | Roberts .................... | E06B 9/24 |
| 2019/0211620 | A1 | * | 7/2019 | Hay, III ................... | E06B 9/52 |
| 2021/0102427 | A1 | * | 4/2021 | Karolevitz ............... | B41J 29/17 |

FOREIGN PATENT DOCUMENTS

| | | | | | |
|---|---|---|---|---|---|
| KR | 20210076562 | A | * | 6/2021 | ............... E06B 9/52 |

* cited by examiner

*Primary Examiner* — Brent W Herring
(74) *Attorney, Agent, or Firm* — Kenneth E Barnes

(57) ABSTRACT

A mounting system and method for security screens for use with windows having an exterior-facing accessory groove at the outer perimeter of the window frame is disclosed. The mounting system and method according to the present invention reduces materials cost for manufacture of security screens while improving aesthetics of the installation and permitting installation of security screens either at the construction site or during window manufacture, while preserving the window manufacturer's warranty. Exemplary embodiments both with and without a subframe are described.

15 Claims, 12 Drawing Sheets

SECURITY SCREEN MOUNTING SYSTEM AND METHOD THEREFOR

BACKGROUND OF THE INVENTION

Security screens are a popular option to protect windows of businesses and homes from unauthorized intrusion such as burglars breaking the window to gain access, hail or other weather conditions, and other types of damage. Many commonly installed windows are made from materials such as "vinyl" (poly vinyl chloride, or PVC) or fiberglass that due to their relative strength in comparison to materials such as aluminum or wood, are not suitable for using mechanical fasteners such as screws to attach the security screen directly to the window. Also, direct attachment to the window itself, regardless of the material the window is made from, would cause damage such as punctures that could produce leaks and could void the window manufacturer's warranty. Consequently, existing systems and methods for installing security screens often attach the screens to the exterior wall surrounding the window opening, either directly, or using spacers to build out around the window to provide clearance for the installation of the screen in circumstances where the window has not been installed recessed or flush relative to the wall surface. Security screens attached to the wall surrounding the window opening must often be larger than the window they are to protect, which is both aesthetically undesirable and increases manufacturing cost for the screens due to increasing the amount of materials required for their construction. A need therefore exists for a security screen mounting system and method which will not cause damage to the window that could void the window manufacturer's warranty, reduces manufacturing cost for the security screen, and improves the aesthetics of the installed screens by not hiding the window behind an oversized security screen.

REFERENCE NUMBERS

100 Window frame
110 Header
112 Left jamb
114 Right jamb
116 Sill
120 Accessory groove
200 Security screen
220 Screen subframe
222 Subframe mounting flange
230 Subframe flange cover
240 Screen main frame
242 Screen
244 Screen retaining strip
246 Weatherstripping
248 Screen retaining screws
260 Hinge
280 Latch
300 Security screen (center hinged)
320 Screen panels
322 Fixed screen panel
324 Working screen panel
340 Connecting hinge
400 Security screen (top hinged)
500 Mounting rail
510 Mounting rail flange
512 Longitudinal ridges
520 Fasteners
530 Hole covers

DETAILED DESCRIPTION OF THE DRAWINGS

Figure 1:
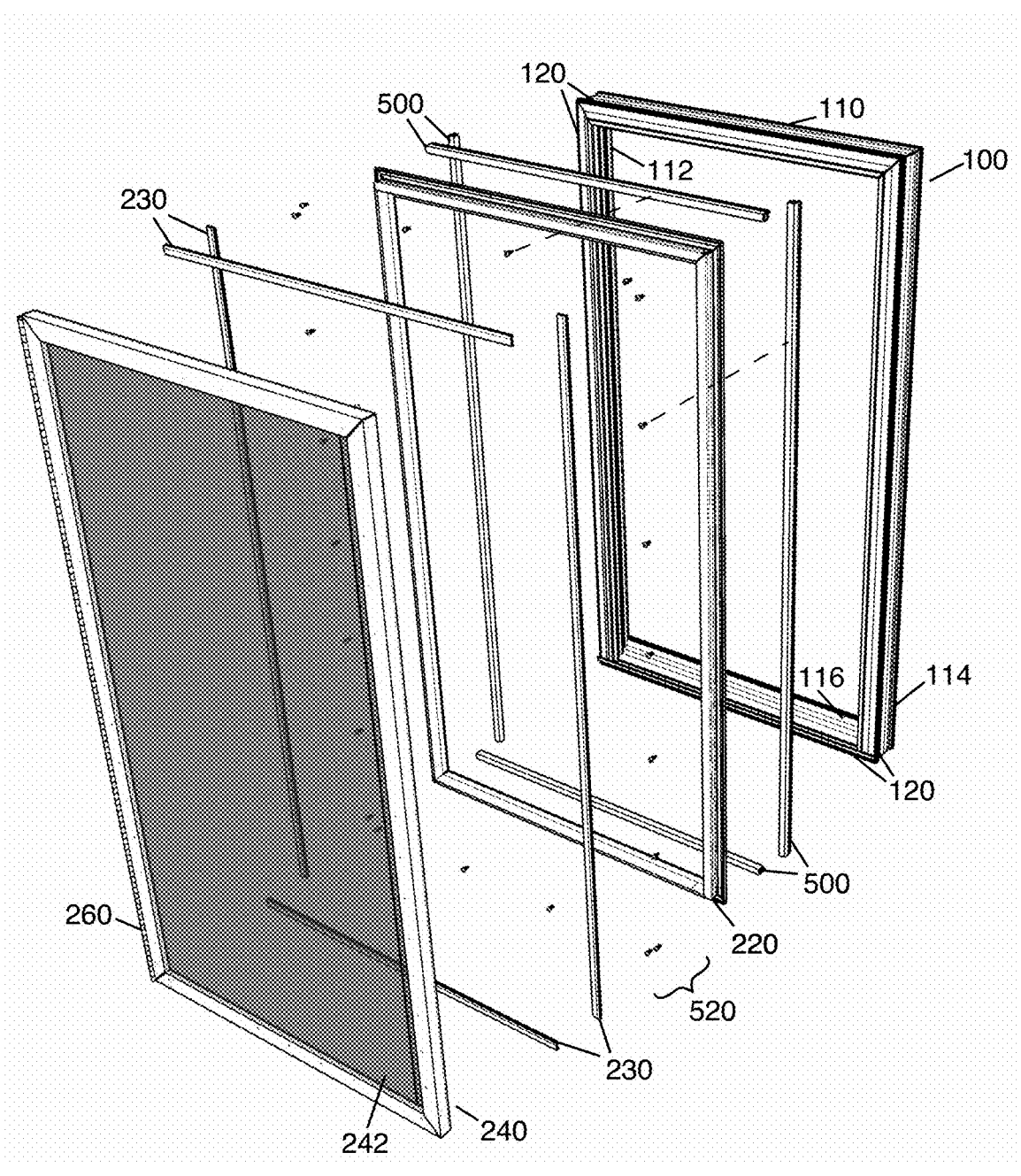
FIG. 1 is an exploded oblique front elevation view of a hinged security screen in closed position illustrating a mounting method according to an embodiment of the invention.

FIG. 1 is an exploded oblique front elevation view of a hinged security screen in closed position illustrating a mounting method according to an embodiment of the invention. For windows having an exterior-facing accessory groove 120 at the outer perimeter of the window frame 100, which would include most vinyl windows, a plurality of mounting rails 500, each having a mounting rail flange 510 (see FIGS. 3a, 3b) configured to fit within and be inserted into the accessory groove 120, is sized to the lengths of the accessory groove 120 of the header 110, left jamb 112, right jamb 114, and sill 116 of the window frame 100, and a security screen mounted thereon. In this exemplary embodiment of a mounting method according to the present invention, the security screen is comprised of a main frame 240 and a subframe 220, with the main frame 240 attached to the subframe 220 via a hinge 260 or other pivotable mounting means. The main frame 240 is provided with a screen 242, which in a preferred embodiment is made of powder-coated steel mesh. In a preferred embodiment, fasteners 520 are driven through the subframe mounting flange 222 (see FIG. 3*b*) into the mounting rails 500, and the fasteners 520 are then concealed behind covers 230 which may be snapped onto the subframe mounting flange 222. For clarity of illustration, only the window frame 100 is illustrated, and the sashes of the window being protected are not shown.

Figure 2:
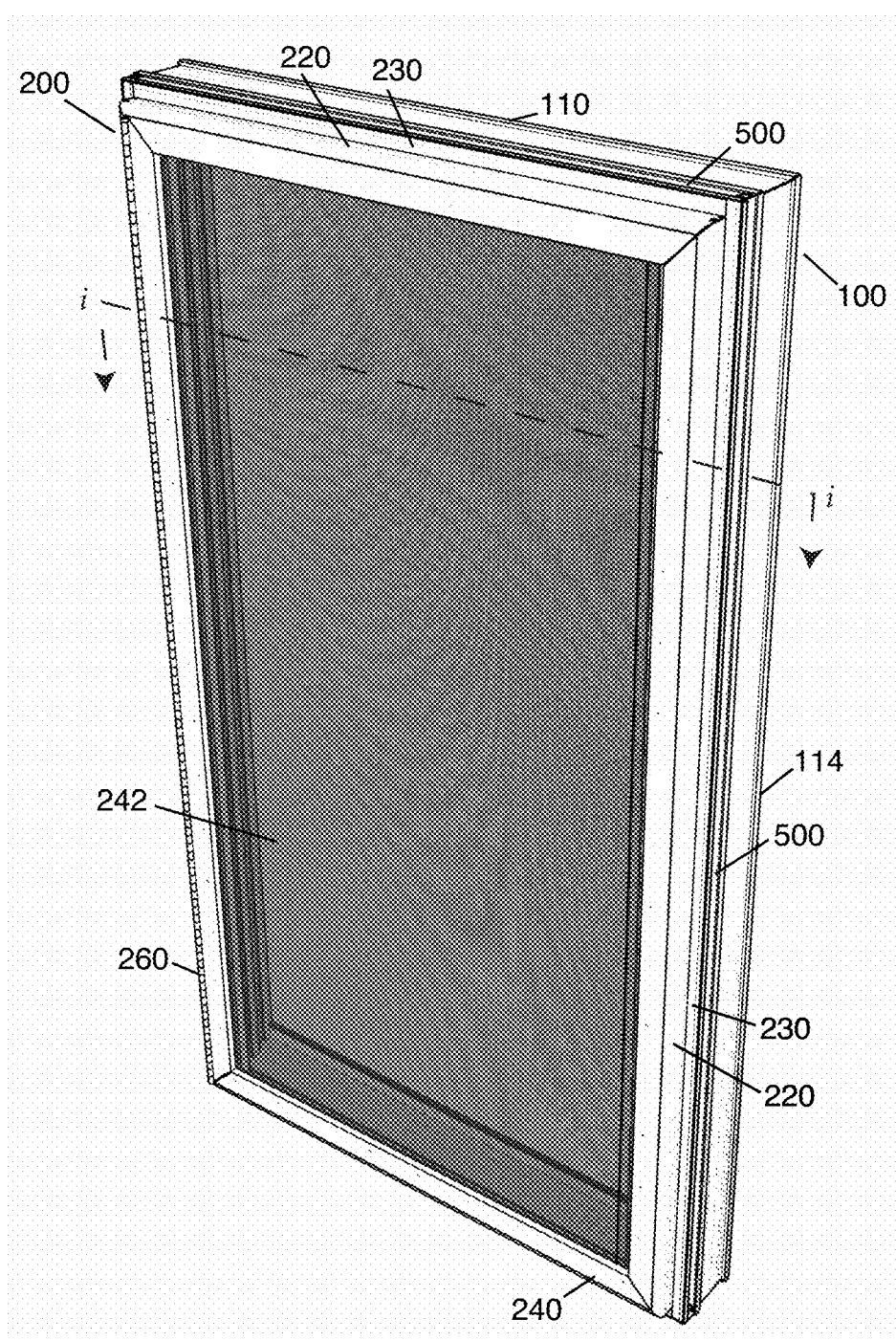
FIG. 2 is an assembled oblique front elevation view of a hinged security screen in closed position illustrating a mounting method according to an embodiment of the invention.

FIG. 2 is an assembled oblique front elevation view of a hinged security screen in closed position illustrating a mounting method according to an embodiment of the invention. In this exemplary embodiment of a mounting method according to the present invention, the security screen 200 is comprised of a main frame 240 and a subframe 220, with the main frame 240 attached to the subframe 220 via a hinge 260 or other pivotable mounting means. This allows the security screen 200 to be pivoted open in the event access or egress through the window is needed, such as during an emergency. In place of the hinge 260, pivot pins may be used as known in the art, to pivotably mount the screen main frame 240 to the screen subframe 220. Besides the left jamb side as shown here, the hinge 260 or other pivotable mounting means may be located at the header side of the security screen 200 or the or right jamb side as desired. The main frame 240 is provided with a screen 242, which in a preferred embodiment is made of powder-coated steel mesh. The subframe 220 is mounted to the window frame 100 via a plurality of mounting rails 500 which are sized to the lengths of the accessory groove 120 of the header 110, left jamb 112, right jamb 114, and sill 116 of the window frame 100. For aesthetic purposes, the subframe is provided with covers 230 which conceal the fasteners 520 which mount the subframe 220 to the mounting rails 500, giving a finished look to the installation. For clarity of illustration, only the window frame 100 is illustrated, and the sashes of the window being protected are not shown.

Figure 3A:
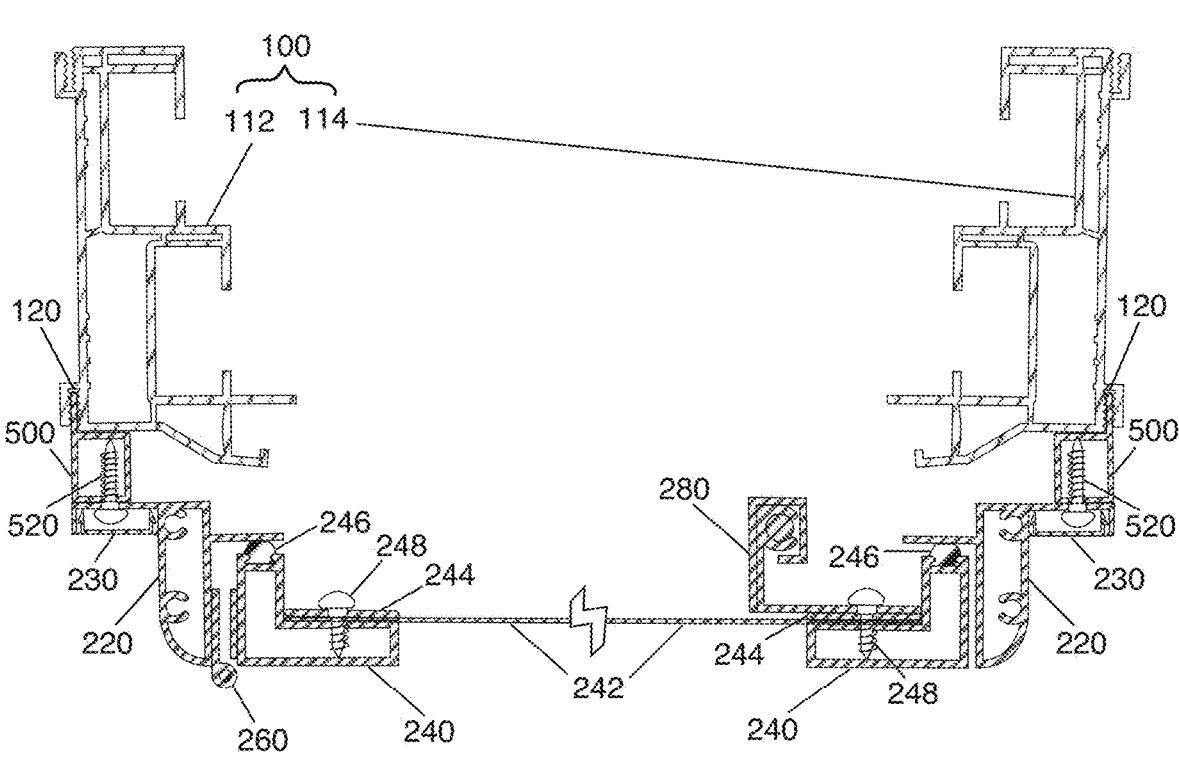
FIG. 3a is an assembled cross-sectional plan view of the hinged security screen of FIG. 2 sectioned along line i-i and illustrating a mounting method according to an embodiment of the invention.

FIG. 3*a* is an assembled cross-sectional plan view of the hinged security screen of FIG. 2 sectioned along line i-i and illustrating a mounting method according to an embodiment of the invention. For windows having an exterior-facing accessory groove 120 at the outer perimeter of the window frame 100, which would include most vinyl windows, a plurality of mounting rails 500, each having a mounting rail flange 510 (see FIG. 3*b*) configured to fit within and be inserted into the accessory groove 120, is sized to the lengths of the accessory groove 120 of the header 110, left jamb 112, right jamb 114, and sill 116 of the window frame 100, and a security screen mounted thereon. The security screen 200 according to the present invention is thus smaller in size than prior art security screens relative to the window to be protected, such as those which must be mounted to the wall surrounding the window, and the mounting method according to the present invention does not require using mechanical fasteners such as screws to attach the security screen directly to the window. Direct attachment to the window itself, regardless of the material the window is made from, would cause damage such as punctures that could produce leaks and could void the window manufacturer's warranty.

In this exemplary embodiment of a mounting method according to the present invention, the security screen 200 is comprised of a main frame 240 and a subframe 220, with the main frame 240 attached to the subframe 220 via a hinge 260 or other pivotable mounting means. In a preferred embodiment, fasteners 520 such as self-tapping screws are used which may be inserted through pre-drilled holes in the subframe mounting flange 222 (see FIG. 3*b*), and driven into the mounting rails 500. For aesthetic purposes, the subframe is provided with covers 230 which conceal the fasteners 520 which mount the subframe 220 to the mounting rails 500, giving a finished look to the installation. The main frame 240 is provided with a screen 242, which in a preferred embodiment is made of powder-coated steel mesh, and as is known in the art, screen retaining strips 244 attached to the main frame with screws 248 may be used to hold the screen 242 in place. Weatherstripping 246 may be provided at the contact area between the main frame 240 and the subframe 220 to seal and cushion around the main frame 240 when closed. A latching means, such as a latch 280 (see FIG. 4) or barrel bolt may be used to reversibly secure the screen main frame 240 to the screen subframe 220 to prevent opening the security screen 200 until released from the interior side of the window. In a preferred embodiment, the latch 280 is a single-point latch as disclosed in U.S. Pat. No. 6,176,041. The mounting rails 500 may be made of any suitable rigid material, such as metal, polymer or composite materials, and in a preferred embodiment are made of metal, specifically extruded aluminum. In a preferred embodiment, the mounting rails 500, screen main frame 240, subframe 220, subframe flange covers 230, and screen retaining strips 244, are made of metal, specifically extruded aluminum, and the hinge is a steel piano hinge. In a preferred embodiment, most of the visible parts are powder-coated for appearance and durability. Although screws are illustrated, bolts or machine screws could be used for the fasteners 520 attaching the subframe 220 of the security screen 200 to mounting rails 500 having threaded holes.

Figure 3B:
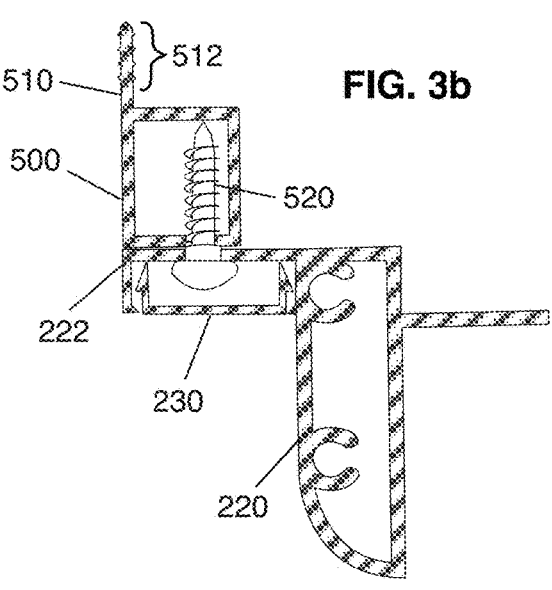
FIG. 3b is a partial detail view of FIG. 3a illustrating a mounting rail, mounting rail flange, screen subframe, subframe mounting flange, and subframe flange cover according to an embodiment of the invention.

FIG. 3*b* is a partial detail view of FIG. 3*a* illustrating a mounting rail 500, mounting rail flange 510, screen subframe 220, subframe mounting flange 222, and subframe flange cover 230 according to an embodiment of the invention. In a preferred embodiment, the mounting rail flange 510 is textured on both sides with longitudinal ridges 512 to enhance contact area within the accessory groove 120. Installation of the security screen 200 according to the present invention, regardless of the configuration of the security screen 200 as shown in the several exemplary embodiments depicted, is accomplished by measuring the length of the accessory groove 120 of the header 110, left jamb 112, right jamb 114, and sill 116 of the window frame 100; sizing the plurality of mounting rails 500 to fit the length of the accessory groove 120 of the header 110, left jamb 112, right jamb 114, and sill 116 of the window frame 100, such as by cutting each of the plurality of mounting rails 500 to the measured length; inserting the mounting rail flange 510 of each of the plurality of mounting rails 500 into the corresponding accessory groove 120 of the header 110, left jamb 112, right jamb 114, and sill 116 of the window frame 100, such as by pressing or tapping each of the plurality of mounting rails 500 into place within their corresponding accessory groove 120; and mounting the security screen 200 thereon as shown and described in the exemplary embodiments depicted. In a preferred embodiment, mounting of the security screen 200 to the plurality of mounting rails 500 is done with mechanical fasteners, such as screws; and the mounting rail flange 510 portion of each of the plurality of mounting rails 500 is positioned towards the perimeter of the window frame 100 (see FIGS. 3a, 7a, and 11) so that the security screen 200 can be the same size as the widow to be protected. If a security screen 200 slightly larger than the window is necessary or desired, the mounting rail flange 510 portion of each of the plurality of mounting rails 500 could be inserted facing toward the center of the window frame 100, and the size of the security screen 200 adjusted accordingly. If desired, prior to insertion of the mounting rail flange 510 within the accessory groove 120, a bead of construction adhesive may be applied to further secure the installation.

Figure 4:
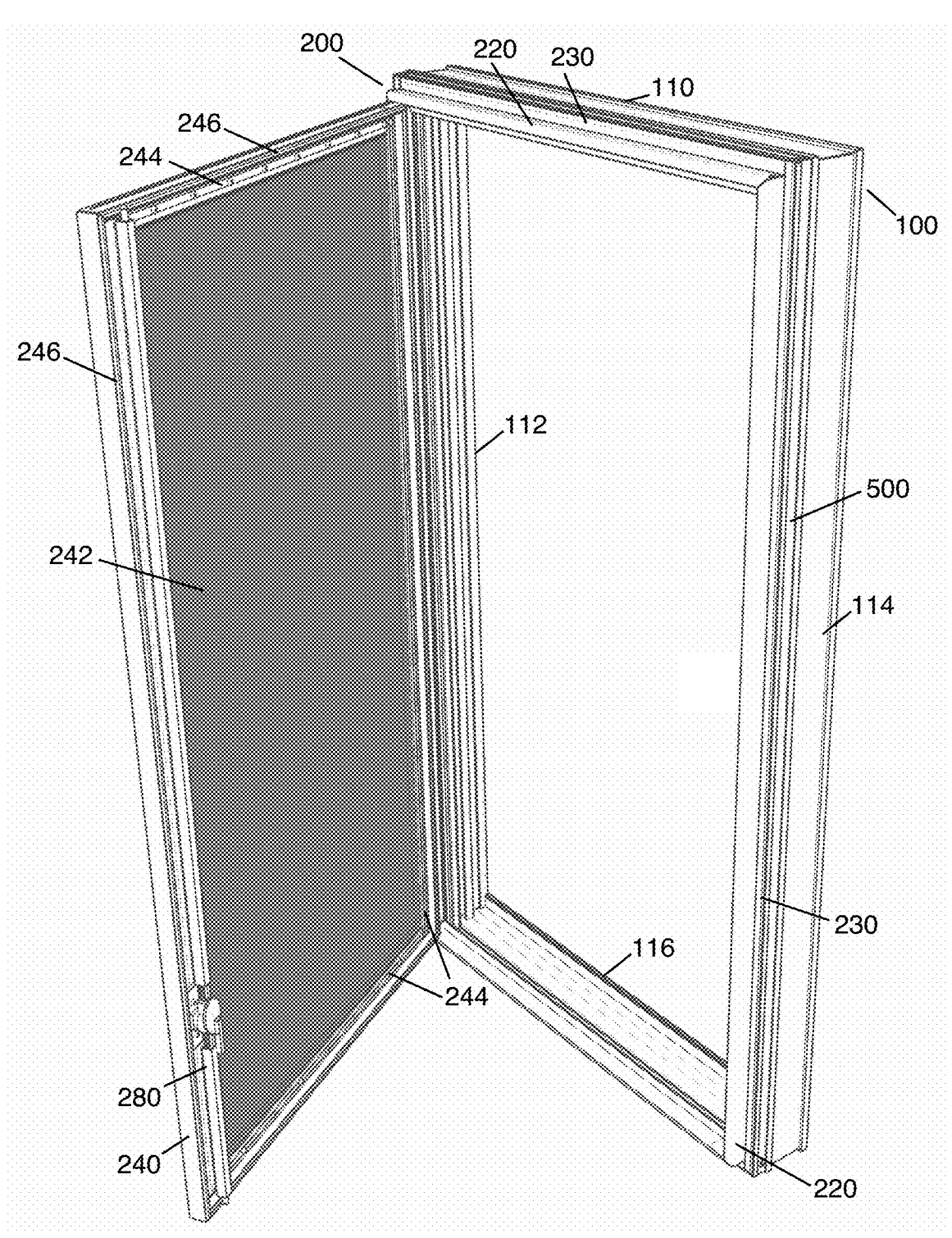
FIG. 4 is an assembled oblique front elevation view of a hinged security screen in open position illustrating a mounting method according to an embodiment of the invention.

FIG. 4 is an assembled oblique front elevation view of a hinged security screen in open position illustrating a mounting method according to an embodiment of the invention. In this exemplary embodiment of a mounting method according to the present invention, the security screen 200 is comprised of a main frame 240 and a subframe 220, with the main frame 240 attached to the subframe 220 via a hinge 260 (see previous FIGS. 1-3a) or other pivotable mounting means. The main frame 240 is provided with a screen 242, which in a preferred embodiment is made of powder-coated steel mesh, and as is known in the art, screen retaining strips 244 attached to the main frame with screws 248 (see FIGS. 3a and 3b) may be used to hold the screen 242 in place. Weatherstripping 246 may be provided at the contact area between the main frame 240 and the subframe 220 to seal and cushion around the main frame 240 when closed. The subframe 220 is mounted to the window frame 100 via a plurality of mounting rails 500 which are sized to the lengths of the accessory groove 120 of the header 110, left jamb 112, right jamb 114, and sill 116 of the window frame 100. For aesthetic purposes, the subframe is provided with covers 230 which conceal the fasteners 520 (see FIGS. 1, 3a and 3b) which mount the subframe 220 to the mounting rails 500, giving a finished look to the installation. A latching means, such as a latch 280 or barrel bolt may be used to reversibly secure the screen main frame 240 to the screen subframe 220 to prevent opening the security screen 200 until released from the interior side of the window. In a preferred embodiment, the latch 280 is a single-point latch as disclosed in U.S. Pat. No. 6,176,041. For clarity of illustration, only the window frame 100 is illustrated, and the sashes of the window being protected are not shown. Security screens according to the present invention may be installed on both single-hung and double hung windows provided they have the necessary exterior-facing accessory groove 120 (see FIGS. 1 and 3a) at the outer perimeter of the window frame 100. Installation of security screens according to the method of the present invention may be done in the field after window installation, or alternatively can be done at the factory during window manufacture. Installation of security screens at the factory during window manufacture is another advantage of the present invention, and can greatly simplify installation at the construction site when compared to installing windows and security screens as separate steps. In addition to operable security screens as illustrated here, security screens which are non-operating, or fixed, rather than hinged and able to open, may be installed in the field according to the method of the present invention.

Figure 5:
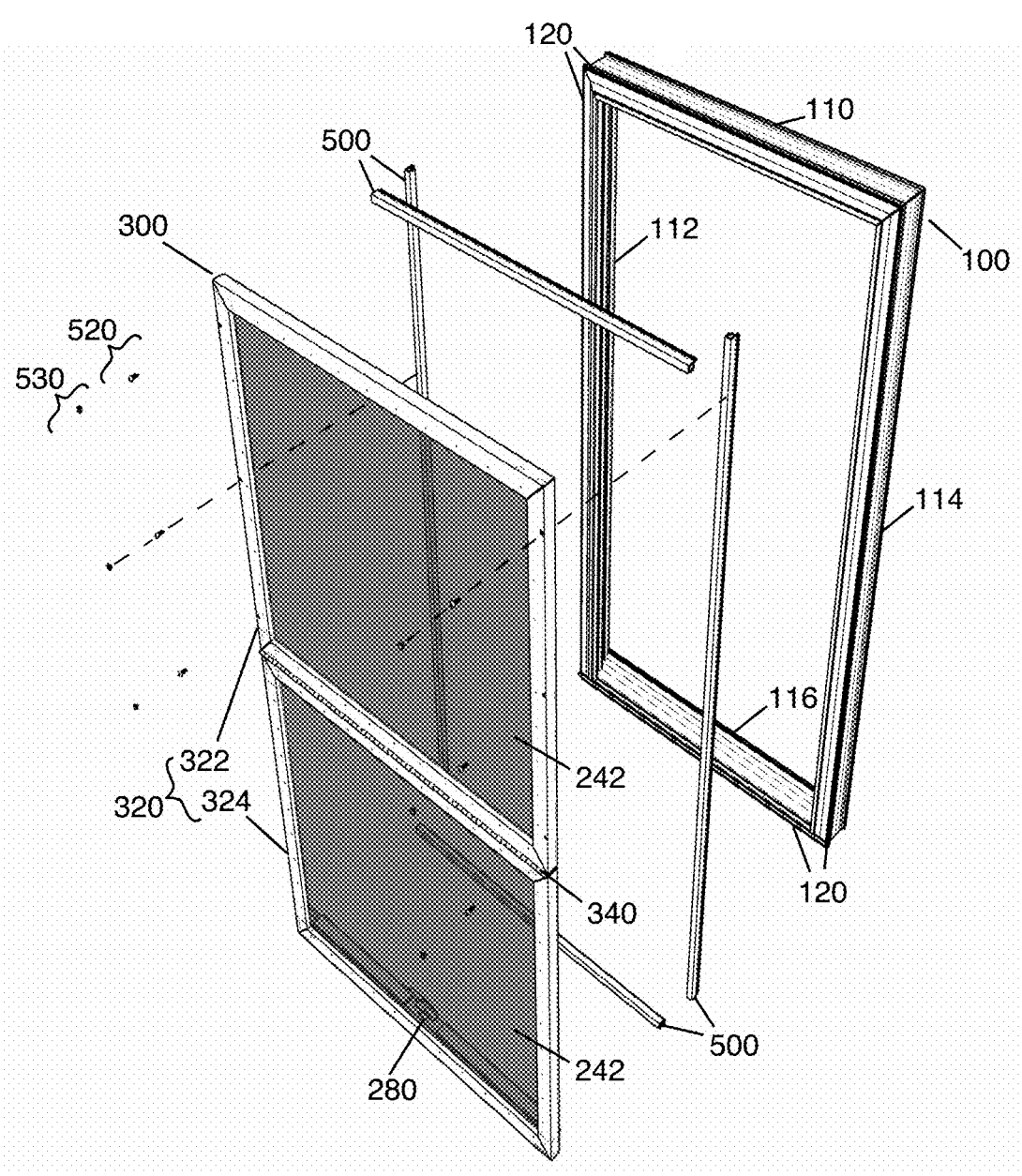
FIG. 5 is an exploded oblique front elevation view of a hinged security screen in closed position illustrating a mounting method according to an embodiment of the invention.

FIG. 5 is an exploded oblique front elevation view of a hinged security screen in closed position illustrating a mounting method according to an embodiment of the invention. For windows having an exterior-facing accessory groove 120 at the outer perimeter of the window frame 100, which would include most vinyl windows, a plurality of mounting rails 500, each having a mounting rail flange 510

(see FIGS. 7a, 7b) configured to fit within and be inserted into the accessory groove 120, is sized to the lengths of the accessory groove 120 of the header 110, left jamb 112, right jamb 114, and sill 116 of the window frame 100, and a security screen mounted thereon. In this exemplary embodiment of a mounting method according to the present invention, the security screen 300 does not include a subframe 220 (see FIGS. 1-4) but is comprised of two screen panels 320, joined by a connecting hinge 340, or other pivoting attachment means. This allows the working screen panel 324 of the security screen 300 to be pivoted open in the event access or egress through the window is needed, such as during an emergency. The screen panels 320 of this embodiment have the same profile as the screen main frame 240 of the embodiment shown in FIGS. 1-4 but instead of being used with a screen subframe 220, the fixed screen panel 322 of this embodiment is attached directly to the mounting rails 500 using fasteners 520, such as screws, and in a preferred embodiment the screws are self-tapping screws which are inserted into pre-drilled holes in the fixed screen panel 322 and driven into the mounting rails 500 (see FIGS. 7a, 7b). The holes are then plugged by hole covers 530 to provide a finished look to the installation. The screen panels 320 are provided with screens 242, which in a preferred embodiment are made of powder-coated steel mesh. A latching means, such as a latch 280 or barrel bolt may be used to reversibly secure the operating screen panel 324 to prevent it opening until released from the interior side of the window. In a preferred embodiment, the latch 280 is a single-point latch as disclosed in U.S. Pat. No. 6,176,041. For clarity of illustration, only the window frame 100 is illustrated, and the sashes of the window being protected are not shown.

Figure 6:
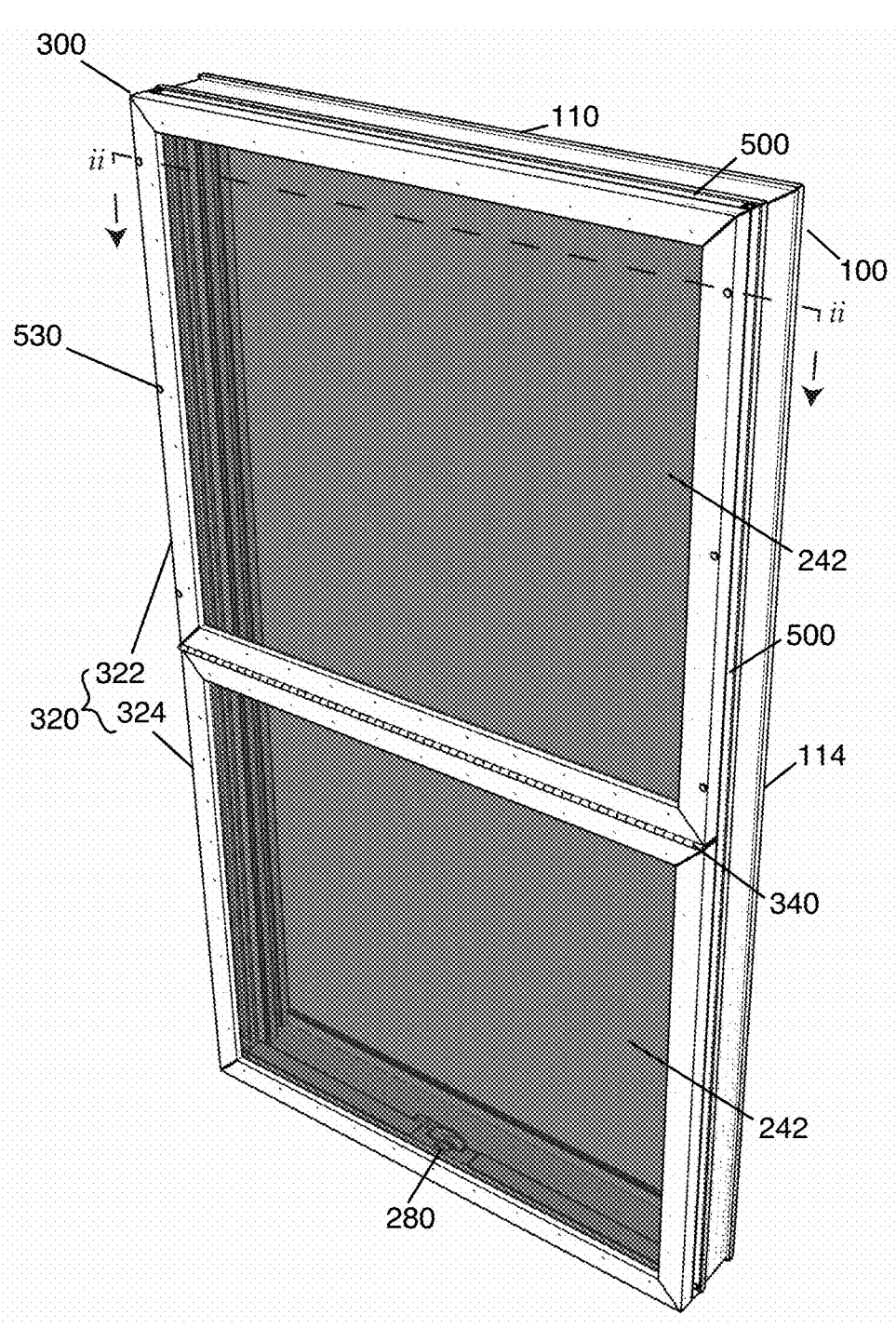
FIG. 6 is an assembled oblique front elevation view of a hinged security screen in closed position illustrating a mounting method according to an embodiment of the invention.

FIG. 6 is an assembled oblique front elevation view of a hinged security screen in closed position illustrating a mounting method according to an embodiment of the invention. In this exemplary embodiment of a mounting method according to the present invention, the security screen is comprised of two screen panels 320, joined by a connecting hinge 340, or other pivoting attachment means. This allows the working screen panel 324 of the security screen 300 to be pivoted open in the event access or egress through the window is needed, such as during an emergency. The screen panels 320 are provided with screens 242, which in a preferred embodiment are made of powder-coated steel mesh. Pre-drilled holes in the fixed screen panel 322 are sized to accept fasteners 520 which are driven into the mounting rails 500 (see FIGS. 7a, 7b), and the holes are then plugged by hole covers 530 to provide a finished look to the installation. A latching means, such as a latch 280 or barrel bolt may be used to reversibly secure the operating screen panel 324 to prevent it opening until released from the interior side of the window. In a preferred embodiment, the latch 280 is a single-point latch as disclosed in U.S. Pat. No. 6,176,041. For clarity of illustration, only the window frame 100 is illustrated, and the sashes of the window being protected are not shown.

Figure 7A:
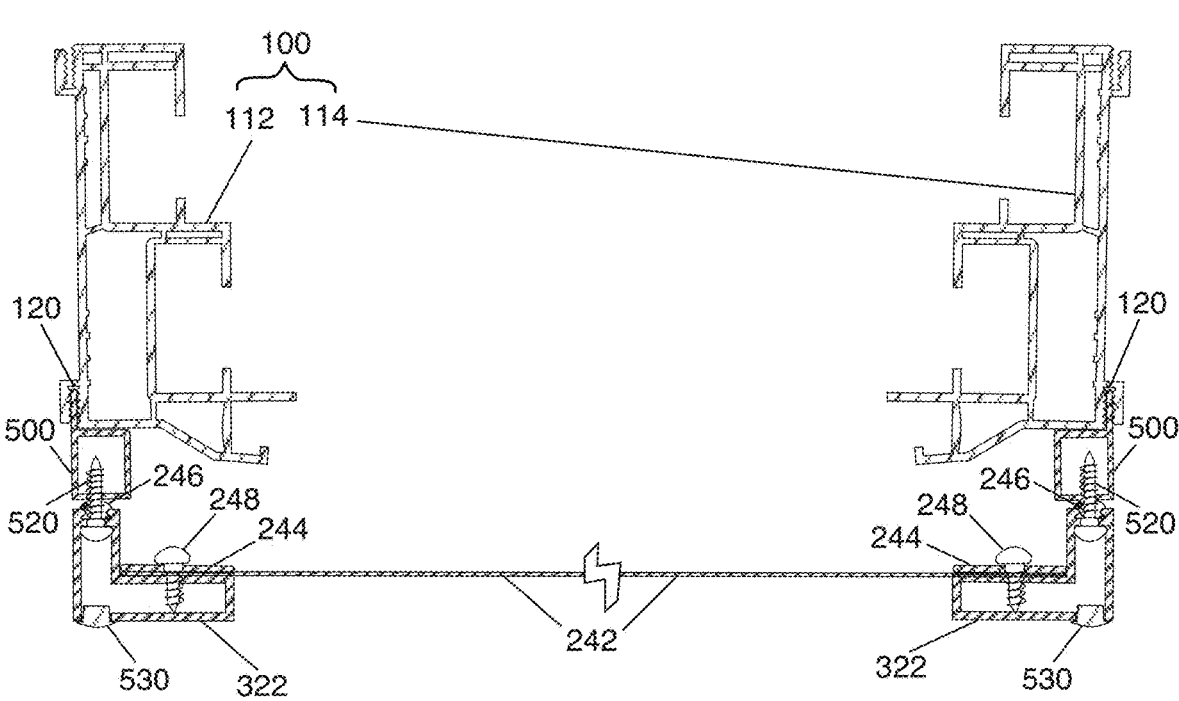
FIG. 7a is an assembled cross-sectional plan view of the hinged security screen of FIG. 6 sectioned along line ii-ii and illustrating a mounting method according to an embodiment of the invention.

FIG. 7a is an assembled cross-sectional plan view of the hinged security screen of FIG. 6 sectioned along line ii-ii and illustrating a mounting method according to an embodiment of the invention. For windows having an exterior-facing accessory groove 120 at the outer perimeter of the window frame 100, which would include most vinyl windows, a plurality of mounting rails 500, each having a mounting rail flange 510 (see FIG. 7b) configured to fit within and be inserted into the accessory groove 120, is sized to the lengths of the accessory groove 120 of the header 110, left jamb 112, right jamb 114, and sill 116 of the window frame 100, and a security screen mounted thereon. Pre-drilled holes in the fixed screen panel 322 are sized to accept fasteners 520 which are driven into the mounting rails 500 (see FIGS. 5 and 7b), and the holes are then plugged by hole covers 530 to provide a finished look to the installation. In a preferred embodiment, the fasteners 520 are self-tapping screws. Weatherstripping 246 may be provided at the contact area between the screen panels 320 and the mounting rails 500 to seal gaps, and to cushion around the operating screen panel 324 when closed. In a preferred embodiment, the fasteners 520 attaching the fixed screen panel 322 to the mounting rails 500 penetrate the weatherstripping 246 of the fixed screen panel 322 when installed. The fixed screen panel 322 is provided with a screen 242, which in a preferred embodiment is made of powder-coated steel mesh, and as is known in the art, screen retaining strips 244 attached to the fixed screen panel 322 with screws 248 may be used to hold the screen 242 in place. The mounting rails 500 may be made of any suitable rigid material, such as metal, polymer or composite materials, and in a preferred embodiment are made of metal, specifically extruded aluminum. In a preferred embodiment, the mounting rails 500, fixed 322 and operating 324 screen panels (collectively 320), and screen retaining strips 244, are made of metal, specifically extruded aluminum, and the connecting hinge 340 is a steel piano hinge. In a preferred embodiment, most of the visible parts are powder-coated for appearance and durability, aside from the hole covers 530 which can be made of any suitable resilient polymer. Although screws are illustrated, bolts or machine screws could be used for the fasteners 520 attaching the fixed screen panel 322 to mounting rails 500 having threaded holes.

Figure 7B:
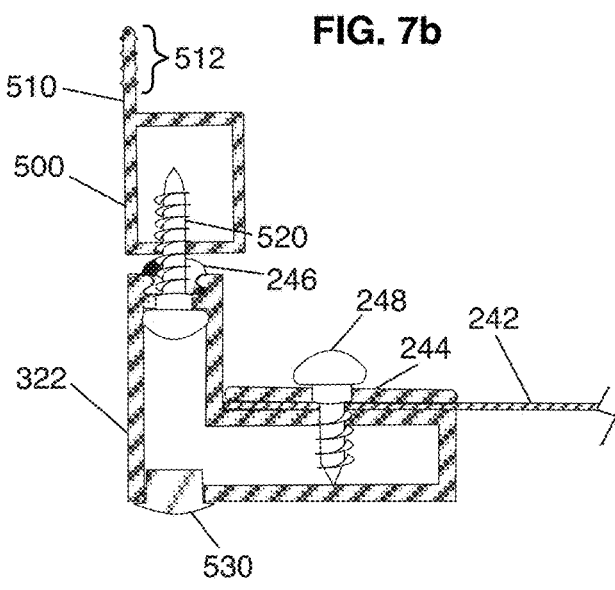
FIG. 7b is a partial detail view of FIG. 7a illustrating a mounting rail, mounting rail flange, security screen, and hole cover according to an embodiment of the invention.

FIG. 7b is a partial detail view of FIG. 7a illustrating a mounting rail 500, mounting rail flange 510, fixed screen panel 322, and hole cover 530 according to an embodiment of the invention. In a preferred embodiment, the mounting rail flange 510 is textured on both sides with longitudinal ridges 512 to enhance contact area within the accessory groove 120. If desired, prior to insertion of the mounting rail flange 510 within the accessory groove 120, a bead of construction adhesive may be applied to further secure the installation.

Figure 8:
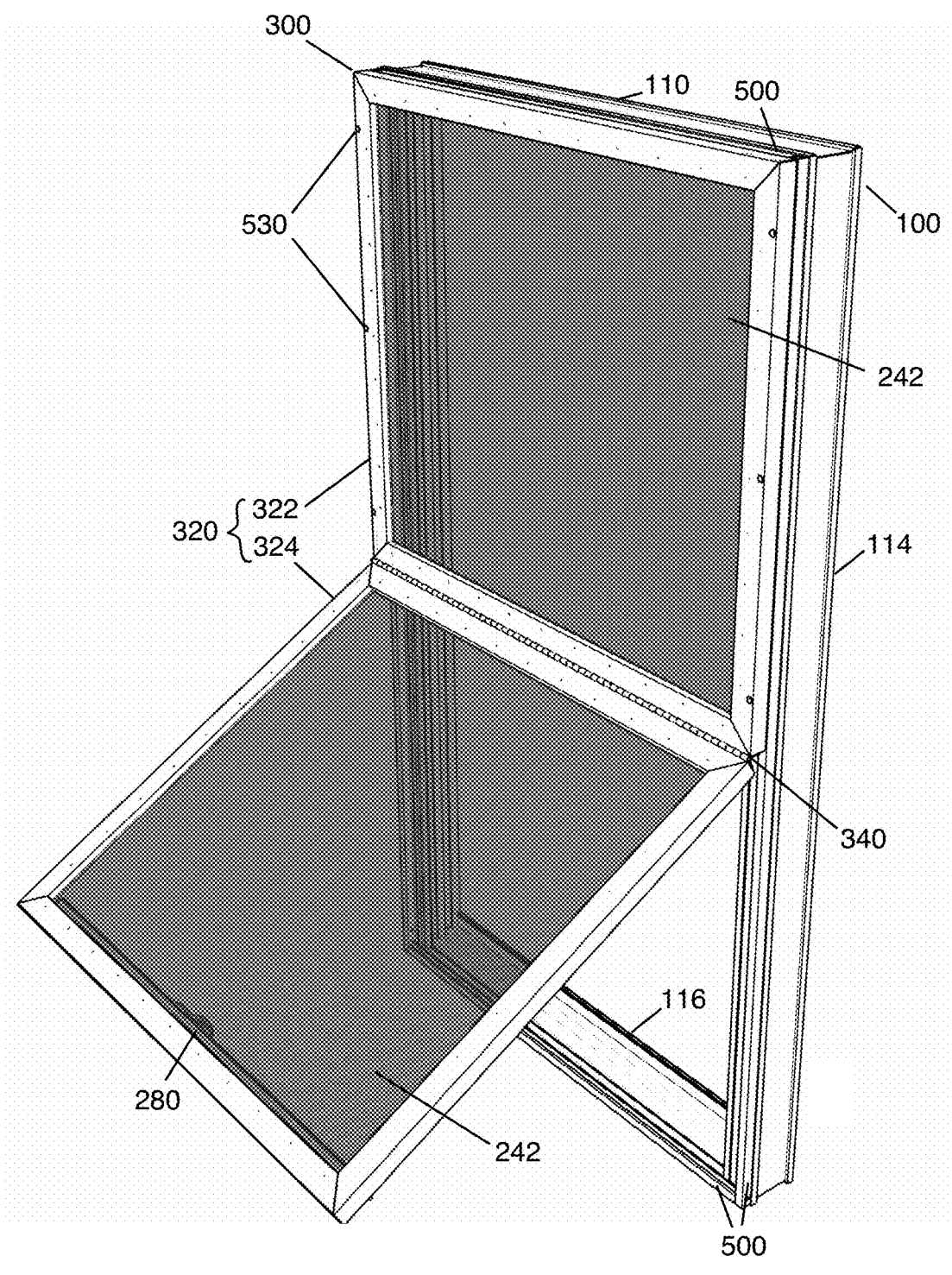
FIG. 8 is an assembled oblique front elevation view of a hinged security screen in open position illustrating a mounting method according to an embodiment of the invention.

FIG. 8 is an assembled oblique front elevation view of a hinged security screen in open position illustrating a mounting method according to an embodiment of the invention. In this exemplary embodiment of a mounting method according to the present invention, the security screen is comprised of two screen panels 320, joined by a connecting hinge 340, or other pivoting attachment means. This allows the working screen panel 324 of the security screen 300 to be pivoted open in the event access or egress through the window is needed, such as during an emergency. The screen panels 320 are provided with screens 242, which in a preferred embodiment are made of powder-coated steel mesh. Pre-drilled holes in the fixed screen panel 322 are sized to accept fasteners 520 which are driven into the mounting rails 500 (see FIGS. 7a, 7b), and the holes are then plugged by hole covers 530 to provide a finished look to the installation. A latching means, such as a latch 280 or barrel bolt may be used to reversibly secure the operating screen panel 324 to prevent it opening until released from the interior side of the window. In a preferred embodiment, the latch 280 is a single-point latch as disclosed in U.S. Pat. No. 6,176,041. For clarity of illustration, only the window frame 100 is illustrated, and the sashes of the window being protected are not shown.

Figure 9:
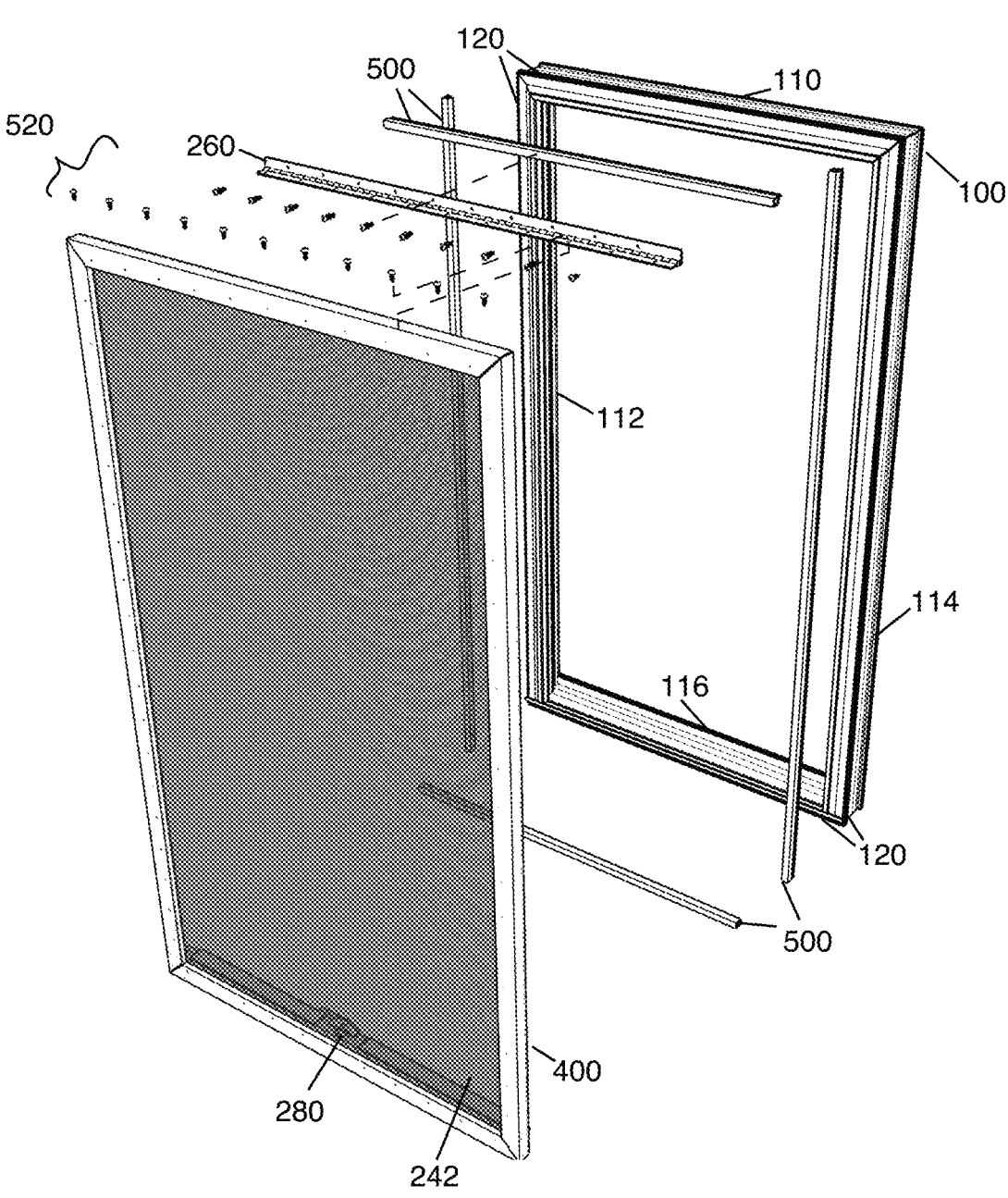
FIG. 9 is an exploded oblique front elevation view of a hinged security screen in closed position illustrating a mounting method according to an embodiment of the invention.

FIG. 9 is an exploded oblique front elevation view of a hinged security screen in closed position illustrating a mounting method according to an embodiment of the invention. For windows having an exterior-facing accessory groove 120 at the outer perimeter of the window frame 100, which would include most vinyl windows, a plurality of mounting rails 500, each having a mounting rail flange 510 (see FIGS. 5b, 7b) configured to fit within and be inserted into the accessory groove 120, is sized to the lengths of the accessory groove 120 of the header 110, left jamb 112, right jamb 114, and sill 116 of the window frame 100, and a security screen mounted thereon. In this exemplary embodiment of a mounting method according to the present invention, the security screen 400 is attached to the mounting rail 500 inserted in the accessory groove 120 of the header 110 via a hinge 260, or other pivotable mounting means. Fasteners 520 are used to attach the hinge 260 to the mounting rail 500 in the accessory groove 120 of the header 110. In a preferred embodiment, the fasteners 520 are self-tapping screws inserted into pre-drilled holes in the hinge and driven into the security screen 400 and the mounting rail 500 inserted in the accessory groove 120 of the header 110. The security screen 400 is provided with a screen 242, which in a preferred embodiment is made of powder-coated steel mesh. A latching means, such as a latch 280 or barrel bolt may be used to reversibly secure the security screen 400 to prevent it opening until released from the interior side of the window. In a preferred embodiment, the latch 280 is a single-point latch as disclosed in U.S. Pat. No. 6,176,041. For clarity of illustration, only the window frame 100 is illustrated, and the sashes of the window being protected are not shown.

Figure 10:
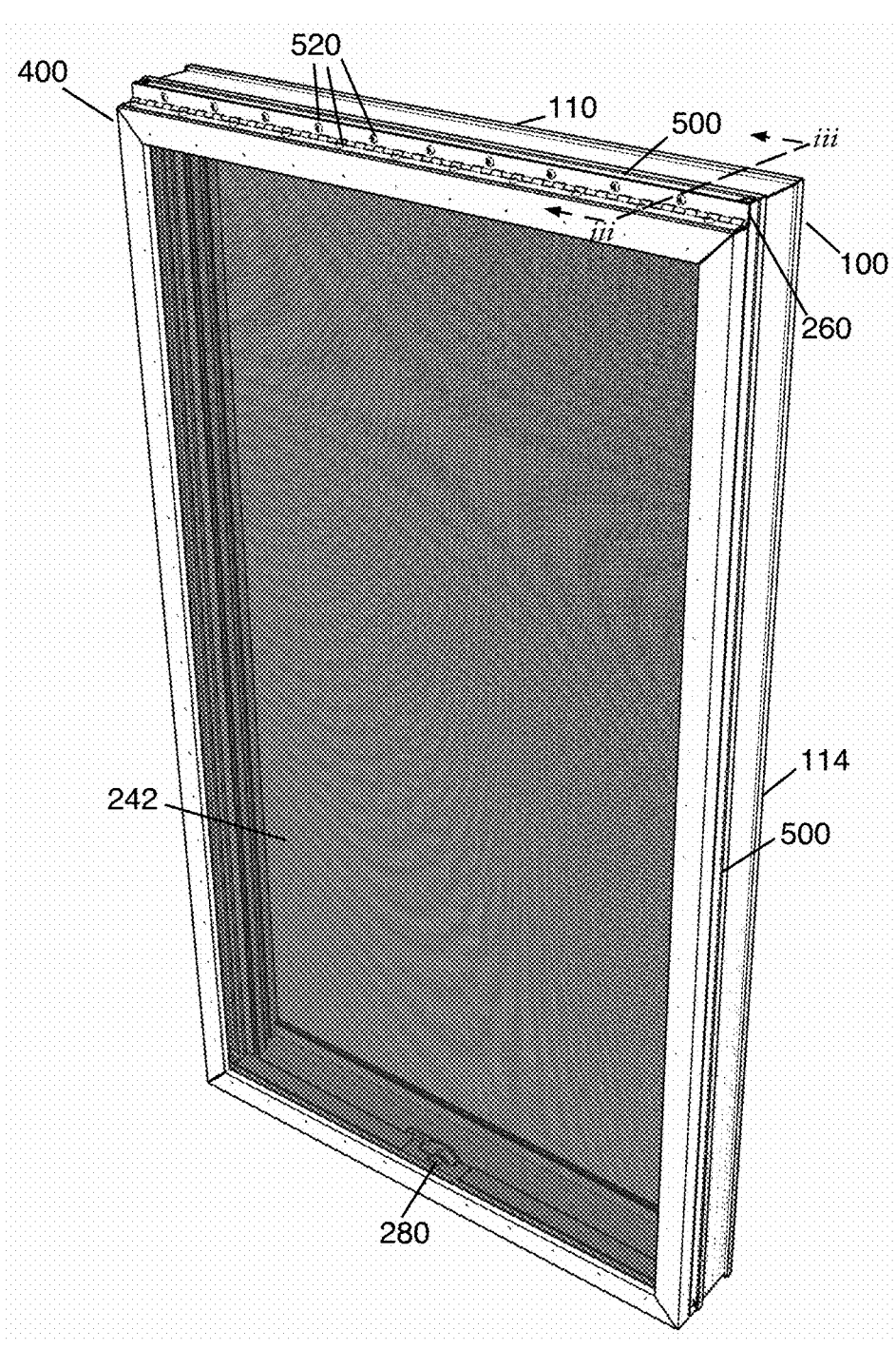
FIG. 10 is an assembled oblique front elevation view of a hinged security screen in closed position illustrating a mounting method according to an embodiment of the invention.

FIG. 10 is an assembled oblique front elevation view of a hinged security screen in closed position illustrating a mounting method according to an embodiment of the invention. In this exemplary embodiment of a mounting method according to the present invention, the security screen 400 is attached to the mounting rail 500 inserted in the accessory groove 120 of the header 110 via a hinge 260, or other pivotable mounting means. Fasteners 520 are used to attach the hinge 260 to the mounting rail 500 in the accessory groove 120 of the header 110. In a preferred embodiment, the fasteners 520 are self-tapping screws inserted into pre-drilled holes in the hinge and driven into the security screen 400 and the mounting rail 500 inserted in the accessory groove 120 of the header 110. The security screen 400 is provided with a screen 242, which in a preferred embodiment is made of powder-coated steel mesh. A latching means, such as a latch 280 or barrel bolt may be used to reversibly secure the security screen 400 to prevent it opening until released from the interior side of the window. This allows the security screen 400 to be pivoted open in the event access or egress through the window is needed, such as during an emergency. In a preferred embodiment, the latch 280 is a single-point latch as disclosed in U.S. Pat. No. 6,176,041. For clarity of illustration, only the window frame 100 is illustrated, and the sashes of the window being protected are not shown.

Figure 11:
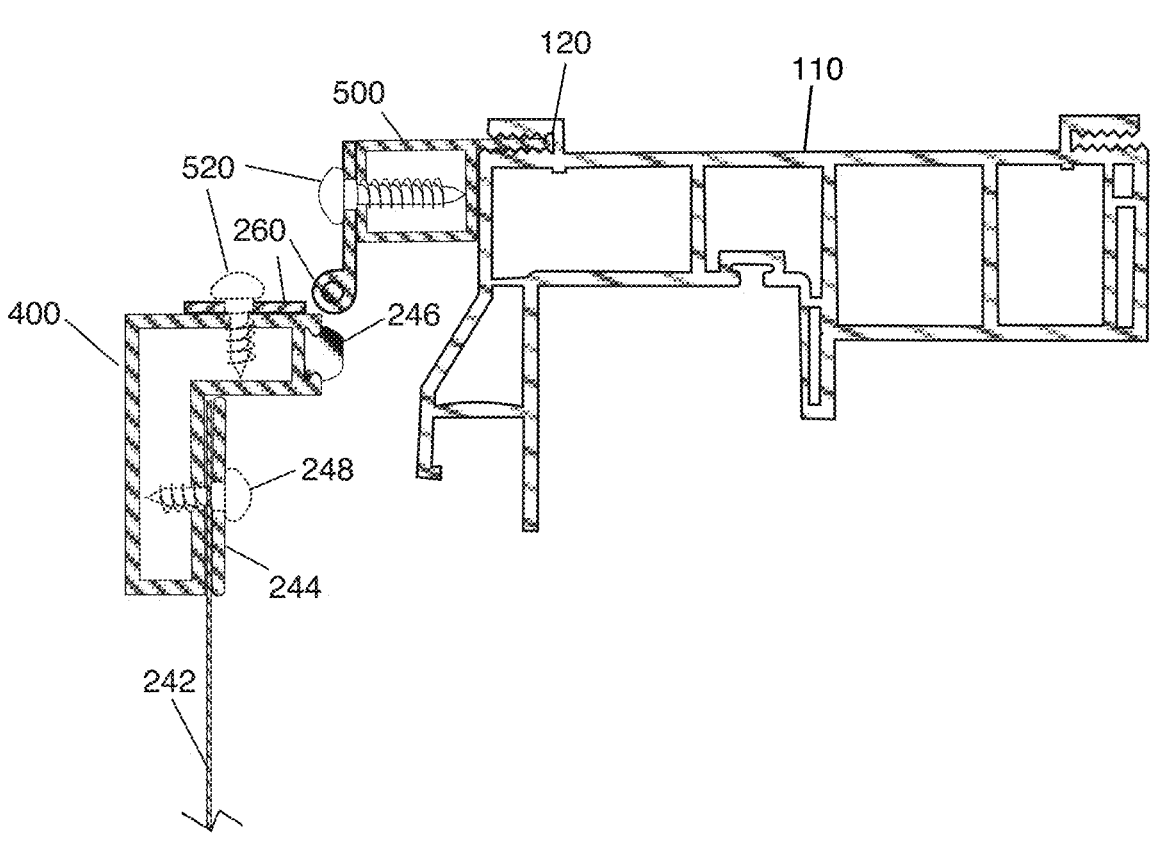
FIG. 11 is an assembled cross-sectional elevation view of the hinged security screen of FIG. 9 sectioned along line iii-iii and illustrating a mounting method according to an embodiment of the invention.

FIG. 11 is an assembled cross-sectional elevation view of the hinged security screen of FIG. 9 sectioned along line iii-iii and illustrating a mounting method according to an embodiment of the invention. For windows having an exterior-facing accessory groove 120 at the outer perimeter of the window frame 100, which would include most vinyl windows, a plurality of mounting rails 500, each having a mounting rail flange 510 (see FIGS. 5b and 7b) configured to fit within and be inserted into the accessory groove 120, is sized to the lengths of the accessory groove 120 of the header 110, left jamb 112, right jamb 114, and sill 116 of the window frame 100, and a security screen mounted thereon. In this exemplary embodiment of a mounting method according to the present invention, the security screen 400 is attached to the mounting rail 500 inserted in the accessory groove 120 of the header 110 via a hinge 260, or other pivotable mounting means. Fasteners 520 are used to attach the hinge 260 to the mounting rail 500 in the accessory groove 120 of the header 110. In a preferred embodiment, the fasteners 520 are self-tapping screws inserted into pre-drilled holes in the hinge and driven into the security screen 400 and the mounting rail 500 inserted in the accessory groove 120 of the header 110. The security screen 400 is provided with a screen 242, which in a preferred embodi-ment is made of powder-coated steel mesh, and as is known in the art, screen retaining strips 244 attached to the security screen 400 with screws 248 may be used to hold the screen 242 in place. Weatherstripping 246 may be provided at the contact area between the security screen 400 and the mount-ing rails 500 to seal and cushion around the security screen 400 when closed, although in this exemplary embodiment of the mounting method according to the invention, the weath-erstripping 246 on the header side of the security screen 400 is not in contact with anything. The mounting rails 500 may be made of any suitable rigid material, such as metal, polymer or composite materials, and in a preferred embodi-ment are made of metal, specifically extruded aluminum. In a preferred embodiment, the mounting rails 500, security screen 400, and screen retaining strips 244, are made of metal, specifically extruded aluminum, and the hinge 260 is a steel piano hinge. In a preferred embodiment, most of the visible parts are powder-coated for appearance and durabil-ity. Although screws are illustrated, bolts or machine screws could be used for the fasteners 520 attaching the hinge 260 to a security screen 400 or mounting rails 500 having threaded holes.

Figure 12:
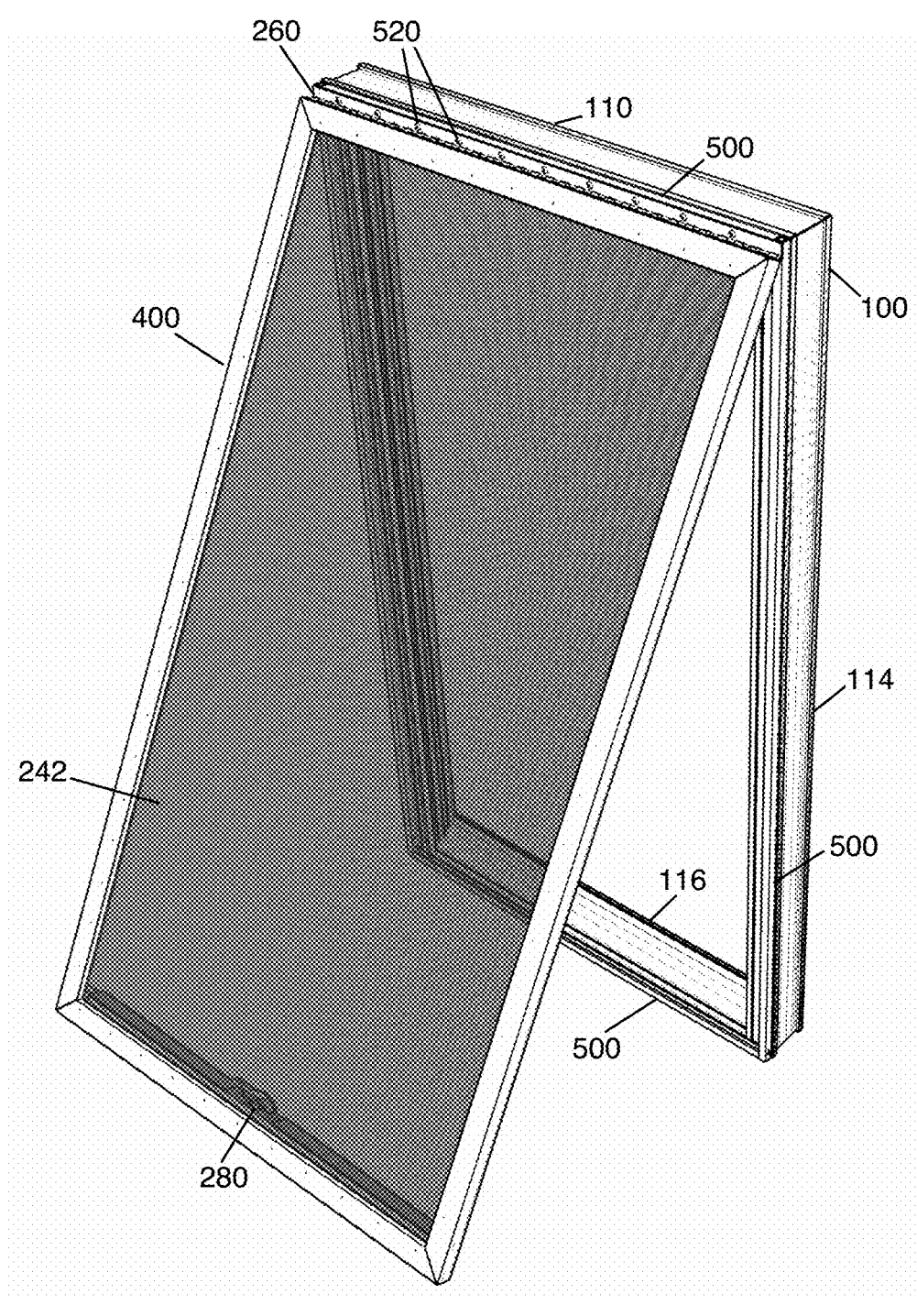
FIG. 12 is an assembled oblique front elevation view of a hinged security screen in open position illustrating a mounting method according to an embodiment of the invention.

FIG. 12 is an assembled oblique front elevation view of a hinged security screen in open position illustrating a mounting method according to an embodiment of the inven-tion. In this exemplary embodiment of a mounting method according to the present invention, the security screen 400 is attached to the mounting rail 500 inserted in the accessory groove 120 of the header 110 via a hinge 260, or other pivotable mounting means. Fasteners 520 are used to attach the hinge 260 to the mounting rail 500 in the accessory groove 120 of the header 110. In a preferred embodiment, the fasteners 520 are self-tapping screws inserted into pre-drilled holes in the hinge and driven into the security screen 400 and the mounting rail 500 inserted in the accessory groove 120 of the header 110. The security screen 400 is provided with a screen 242, which in a preferred embodi-ment is made of powder-coated steel mesh. A latching means, such as a latch 280 or barrel bolt may be used to reversibly secure the security screen 400 to prevent it opening until released from the interior side of the window. This allows the security screen 400 to be pivoted open in the event access or egress through the window is needed, such as during an emergency. In a preferred embodiment, the latch 280 is a single-point latch as disclosed in U.S. Pat. No. 6,176,041. For clarity of illustration, only the window frame 100 is illustrated, and the sashes of the window being protected are not shown.

We claim:

1. A method for mounting a security screen to a window frame, wherein said window frame has frame members consisting of a header, a left jamb, a right jamb, and a sill, and an outer perimeter comprising an exterior-facing acces-sory groove; the method comprising:

(a) measuring the length of said exterior-facing accessory groove of the header, left jamb, right jamb, and sill of said window frame;

(b) sizing each of a plurality of rigid mounting rails to fit the measured length of said exterior-facing accessory groove of the header, left jamb, right jamb, and sill of the window frame, each of said plurality of rigid mounting rails having an exterior-facing surface and a longitudinal flange perpendicular thereto, said longitu-dinal flange comprising two substantially parallel sides and configured to fit within and be inserted into said exterior-facing accessory groove of the header, left jamb, right jamb, and sill of said window frame;

(c) inserting said longitudinal flange of each of said plurality of rigid mounting rails into the corresponding exterior-facing accessory groove of the header, left jamb, right jamb, and sill of said window frame;

(d) fixedly mounting a security screen to said exterior-facing surface of at least one of said plurality of mounting rails using an attachment means wherein said attachment means comprises screws or bolts.

2. The method of claim 1 wherein at least one of said two substantially parallel sides of said longitudinal flange con-figured to fit within and be inserted into said exterior-facing accessory groove of the header, left jamb, right jamb, and sill of the window frame further comprises a plurality of lon-gitudinal ridges.

3. The method of claim 1 further comprising the step of applying of a bead of construction adhesive to said longi-tudinal flange prior to inserting said longitudinal flange of each of said plurality of mounting rails into the correspond-ing exterior-facing accessory groove of the header, left jamb, right jamb, and sill of said window frame.

4. The method of claim 1 wherein said security screen comprises a subframe, and a main frame pivotably attached to said subframe.

5. The method of claim 4 wherein said subframe further comprises a mounting flange at its outer perimeter, and said attachment means comprises screws attaching said subframe to said exterior-facing surface of said at least one of said plurality of rigid mounting rails through said mounting flange.

6. The method of claim 4 wherein said exterior-facing surface of at least one of said plurality of rigid mounting rails further comprises at least one threaded hole, said subframe further comprises a mounting flange at its outer perimeter, said mounting flange comprises at least one mounting hole aligned with said at least one threaded hole in said exterior-facing surface of at least one of said plurality of rigid mounting rails, and said attachment means com-prises at least one bolt attaching said subframe to said exterior-facing surface of said at least one of said plurality of rigid mounting rails through said mounting flange.

7. The method of claim 1, wherein said security screen comprises at least two screen panels, a first screen panel of which is fixedly attached to said exterior-facing surface of at least two of said plurality of rigid mounting rails, and a second screen panel of which is attached to said first screen panel by a pivotable mounting means.

8. The method of claim 1, wherein said security screen is attached to one of said plurality of rigid mounting rails by a pivotable mounting means.

9. A method for mounting a security screen to a window frame, wherein said window frame has frame members consisting of a header, a left jamb, a right jamb, and a sill, and an outer perimeter comprising an exterior-facing accessory groove; the method comprising:

(a) measuring the length of said exterior-facing accessory groove of the header, left jamb, right jamb, and sill of said window frame;

(b) sizing each of a plurality of rigid mounting rails to fit the measured length of said exterior-facing accessory groove of the header, left jamb, right jamb, and sill of the window frame, each of said plurality of rigid mounting rails having an exterior-facing surface and a longitudinal flange perpendicular thereto, said longitudinal flange comprising two substantially parallel sides, and configured to fit within and be inserted into said exterior-facing accessory groove of the header, left jamb, right jamb, and sill of said window frame;

(c) inserting said longitudinal flange of each of said plurality of rigid mounting rails into the corresponding exterior-facing accessory groove of the header, left jamb, right jamb, and sill of said window frame;

(d) fixedly mounting a security screen to said exterior-facing surface of at least one of said plurality of mounting rails using an attachment means, wherein said security screen comprises a subframe, and a main frame pivotably attached to said subframe, said subframe comprising a mounting flange at its outer perimeter, and said attachment means fixedly mounting said subframe to said exterior-facing surface of said at least one of said plurality of rigid mounting rails through said mounting flange.

10. The method of claim 9 further comprising the step of applying of a bead of construction adhesive to said longitudinal flange prior to inserting said longitudinal flange of each of said plurality of mounting rails into the corresponding exterior-facing accessory groove of the header, left jamb, right jamb, and sill of said window frame.

11. The method of claim 9 wherein at least one of said two substantially parallel sides of said longitudinal flange further comprises a plurality of longitudinal ridges.

12. The method of claim 9, wherein said security screen comprises at least two screen panels, a first screen panel of which is fixedly attached to said exterior-facing surface of at least two of said plurality of rigid mounting rails, and a second screen panel of which is attached to said first screen panel by a pivotable mounting means.

13. The method of claim 9, wherein said security screen is fixedly attached to one of said plurality of rigid mounting rails by a pivotable mounting means.

14. A method for mounting a security screen to a window frame, wherein said window frame has frame members consisting of a header, a left jamb, a right jamb, and a sill, and an outer perimeter comprising an exterior-facing accessory groove; the method comprising:

(a) measuring the length of said exterior-facing accessory groove of the header, left jamb, right jamb, and sill of said window frame;

(b) sizing each of a plurality of rigid mounting rails to fit the measured length of said exterior-facing accessory groove of the header, left jamb, right jamb, and sill of the window frame, each of said plurality of rigid mounting rails having an exterior-facing surface and a longitudinal flange perpendicular thereto, said longitudinal flange comprising two substantially parallel sides, and configured to fit within and be inserted into said exterior-facing accessory groove of the header, left jamb, right jamb, and sill of said window frame;

(c) applying of a bead of construction adhesive to said longitudinal flange of each of said plurality of rigid mounting rails;

(d) inserting said longitudinal flange of each of said plurality of rigid mounting rails into the corresponding exterior-facing accessory groove of the header, left jamb, right jamb, and sill of said window frame;

(e) fixedly mounting a security screen to said exterior-facing surface of at least one of said plurality of mounting rails using an attachment means.

15. The method of claim 14, wherein at least one of said two substantially parallel sides of said longitudinal flange configured to fit within and be inserted into said exterior-facing accessory groove of the header, left jamb, right jamb, and sill of the window frame further comprises a plurality of longitudinal ridges.

* * * * *